(12) United States Patent
Schaefer

(10) Patent No.: US 11,378,945 B2
(45) Date of Patent: Jul. 5, 2022

(54) METHOD FOR OPERATING A STATE MONITORING SYSTEM OF A VIBRATING MACHINE AND STATE MONITORING SYSTEM

(71) Applicant: Schenck Process Europe GmbH, Darmstadt (DE)

(72) Inventor: Jan Schaefer, Darmstadt (DE)

(73) Assignee: Schenck Process Europe GmbH, Darmstadt (DE)

(*) Notice: Subject to any disclaimer, the term of this patent is extended or adjusted under 35 U.S.C. 154(b) by 295 days.

(21) Appl. No.: 16/410,707

(22) Filed: May 13, 2019

(65) Prior Publication Data

US 2019/0265689 A1    Aug. 29, 2019

Related U.S. Application Data

(63) Continuation of application No. PCT/EP2017/078933, filed on Nov. 10, 2017.

(30) Foreign Application Priority Data

Nov. 11, 2016   (DE) ............... 10 2016 013 406.2

(51) Int. Cl.
   *G05B 23/02*    (2006.01)
   *G06N 5/02*    (2006.01)

(52) U.S. Cl.
CPC ..... *G05B 23/0283* (2013.01); *G05B 23/0224* (2013.01); *G05B 23/0229* (2013.01); *G05B 23/0254* (2013.01); *G06N 5/022* (2013.01)

(58) Field of Classification Search
CPC ............ G05B 23/0283; G05B 23/0224; G05B 23/0229; G05B 23/0254; G05B 17/02; G06N 5/022; B65G 27/00; B65G 43/00
See application file for complete search history.

(56) References Cited

U.S. PATENT DOCUMENTS 5,566,092 A * 10/1996 Wang ................. G07C 3/00
                                 706/912
6,298,308 B1 * 10/2001 Reid .................. G05B 19/4185
                                 702/56

(Continued)

FOREIGN PATENT DOCUMENTS

CN     201302674 Y    9/2009
DE     195 42 868 A1    5/1997

(Continued)

OTHER PUBLICATIONS

Takashi et al. (JP2005067847, 2005 (English translation by Google, best understood by Examiner)) (Year: 2005).*

(Continued)

*Primary Examiner* — Mohammad K Islam
(74) *Attorney, Agent, or Firm* — Muncy, Geissler, Olds & Lowe, P.C.

(57) ABSTRACT

A method for operating a condition monitoring system of a vibrating machine in the form of a vibrating conveyor or a vibrating screen, it is provided that the condition monitoring system has at least one sensor designed for motion detection and/or acceleration detection, which is mounted on the vibrating machine. The sensor generates measurement data, which is further processed into characteristic values in a processing unit associated with the sensor. The characteristic values are stored as a data set or a plurality of data sets. The data sets and/or the data sets expanded to include metadata are transferred to a data storage and stored there. A knowledge base for an expert system is generated taking into account the information provided by the data sets and/or built on theoretical models.

8 Claims, 3 Drawing Sheets

Legend:
1 - vibrating machine
2 - condition monitoring system
3 - site of vibrating machine
4 - data set
5 - input variables for data acquisition
6 - data storage
7 - data analysis
8 - knowledge base
10 - condition monitoring expert system

(56) References Cited

U.S. PATENT DOCUMENTS

| | | |
|---|---|---|
| 6,308,822 B1 | 10/2001 | Moran et al. |
| 2014/0142872 A1 | 5/2014 | Hedin |
| 2014/0167810 A1* | 6/2014 | Neti .................... G01R 31/343 |
| | | 324/765.01 |
| 2014/0257666 A1 | 9/2014 | Abrol et al. |
| 2016/0341629 A1* | 11/2016 | Schaefer ................ B07B 13/18 |
| 2017/0115179 A1 | 4/2017 | Williamson et al. |
| 2019/0079506 A1* | 3/2019 | Hubauer ............ G05B 23/0281 |

FOREIGN PATENT DOCUMENTS

| | | |
|---|---|---|
| WO | WO2015117750 A1 | 8/2015 |
| WO | WO2015150267 A1 | 10/2015 |

OTHER PUBLICATIONS

International Search Report dated Mar. 14, 2018 in corresponding application PCT/EP2017/078933.
Canadian Search Report for Canadian Application No. 3,031,151 dated Nov. 11, 2019.

* cited by examiner

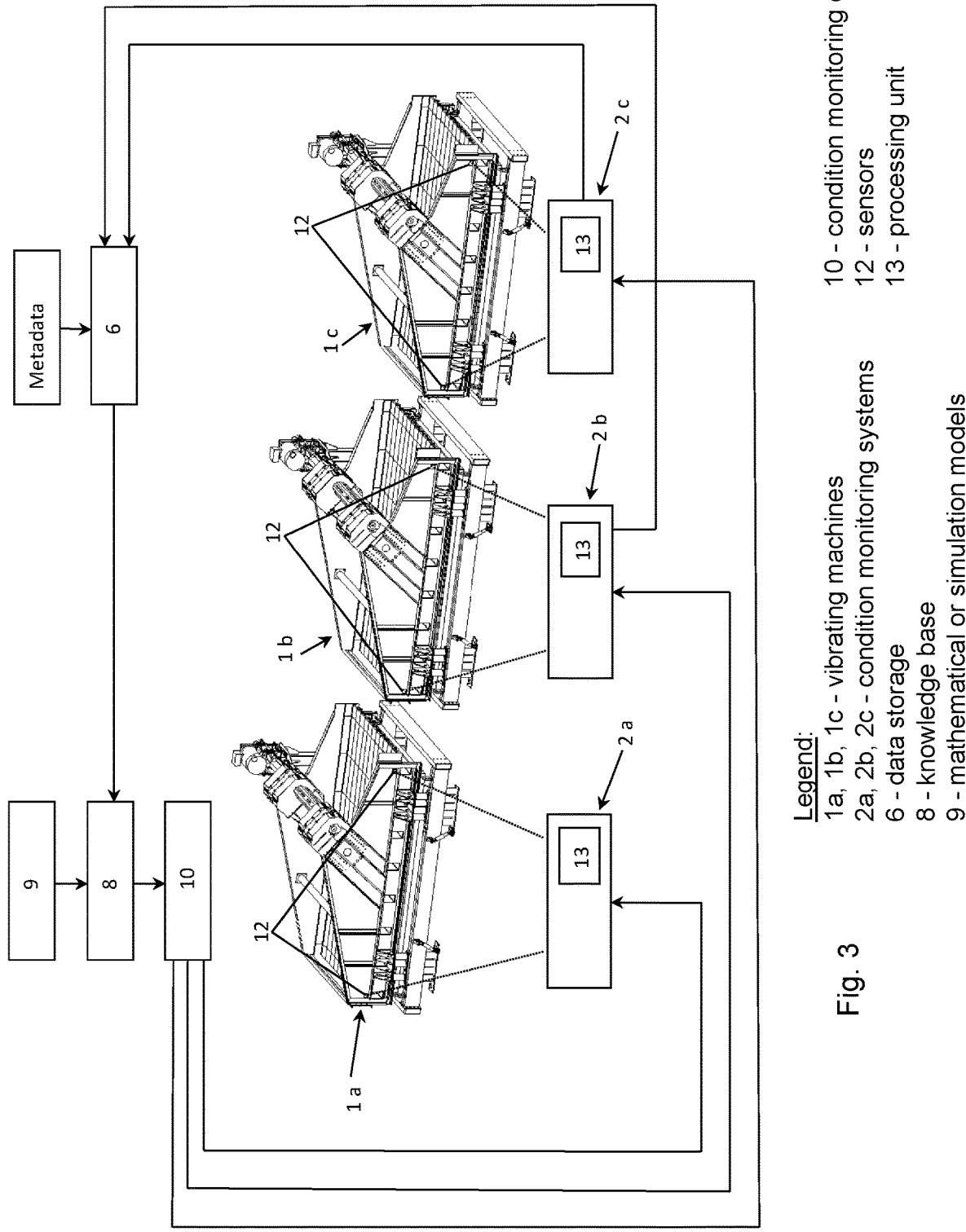

METHOD FOR OPERATING A STATE MONITORING SYSTEM OF A VIBRATING MACHINE AND STATE MONITORING SYSTEM

This nonprovisional application is a continuation of International Application No. PCT/EP2017/078933, which was filed on Nov. 16, 2017, and which claims priority to German Patent Application No. 10 2016 013 406.2, which was filed in Germany on Nov. 11, 2016, and which are both herein incorporated by reference.

BACKGROUND OF THE INVENTION

Field of the Invention

The invention relates to a method for operating a condition monitoring system of a vibrating machine and to a condition monitoring system.

Description of the Background Art

The condition monitoring of vibrating machines is of interest in several respects. Since vibrating machines are subject to a dynamic constant load, a wide range of components of these machines is subjected to high wear. Since failures of machine parts or the entire vibrating machine lead to production losses and loss of revenue, the manufacturers of vibrating machines are anxious to provide their customers with as accurate information as possible as to when wear parts should be replaced or when maintenance work should be done to prevent greater damage or downtime.

From WO 2015/150267 A1, which corresponds to US 2017/0115179, a vibration test system is known, for example, which is able to detect vibrations or other parameters of a vibrator and to analyze them in a way so that the residual lifetime of the vibration test system can be displayed on the basis of the detected values and a predetermined overall lifespan of the vibrator. In accordance with DIN 13306, this is referred to as time-based maintenance that is ultimately based on experience which is time or load-based.

Furthermore, from WO 2015/117750 A1, which corresponds to US 2016/0341629 and which is incorporated herein by reference, a vibrating machine is known containing a device for condition monitoring by means of which the vibration behavior of the vibrating machine can be metrologically detected and analyzed during operation. With the aid of this known condition monitoring device, it is possible to determine whether a vibrating machine oscillates in the expected manner and thus meets its specification. Furthermore, damage to components that has already occurred and therefore causes deviations from the ideal vibration behavior, can be found. In this context, reference can be made to condition-based maintenance.

However, the interpretation of the damage caused by the vibration behavior or the decision as to which components must be replaced, or which measures must be carried out to eliminate the errors in the vibration behavior, is still a matter for experts. On the basis of their experience, they must deduce possible faults and failures from the metrologically recorded data of the vibration behavior and make the appropriate decisions, or organize ordering processes, maintenance work and the like.

SUMMARY OF THE INVENTION

Against this background, the object of the present invention is to further develop known methods for operating a condition monitoring system of a vibrating machine and to develop condition monitoring systems.

The basic idea of the present invention is to provide a method for operating a condition monitoring system of a vibrating machine, in particular a vibrating screen or vibratory conveyor, in which the condition monitoring system comprises at least one sensor that is fixed to a vibrating machine which is designed to acquire measurement data, motion detection and/or acceleration detection.

Condition monitoring can be understood to be the manually or automatically performed action to measure the characteristics and parameters of the actual condition of a unit at certain intervals.

Therefore, a condition monitoring system is a system for the automated execution of condition monitoring.

In the method according to the invention, in a first step a) the sensor detects signals which are further processed in a processing unit as characteristic values connected to the sensor. Operation-specific and machine-specific parameters are thus recorded by a measuring system in the form of a sensor, wherein depending on the type of sensor, the physical quantities to be measured are converted into an electrical quantity. The connection with the processing unit can exist as a wireless connection, a radio connection, a data transfer or as a cable connection. Alternatively, the sensor may be integrated in or part of the processing unit.

In a second step b), these characteristics are stored as a data set or multiple data sets. In a third step c), the metrologically recorded data sets can be expanded to include metadata that includes information regarding the current condition of the vibrating machine. In a further step, the characteristic values and stored data sets are subsequently analyzed.

The evaluation or analysis serves to convert the electrical signals, characteristic values and data sets in such a way that they are directly correlated to the operating and machine conditions being monitored.

Furthermore, an evaluation or analysis of measurement data, which was determined by converting the measurement data, take place as a frequency or orbit analysis.

In the present invention, the data sets and the data sets that are expanded to include metadata are transferred to an external centralized data storage and stored there. Further, knowledge is generated by linking the information including the data and the associated semantics, which is also referred to as "data mining". The storage of this generated knowledge, in turn, is known as a so-called knowledge base. However, the knowledge base can be fed from two sources, for one from the data storage by using the previously described "data mining", and secondly, from theoretical models.

Furthermore, an expert system is generated from the knowledge base (which can be based on both the data mining described above and on theoretical models).

An expert system is understood to mean a software that can support people in solving complex problems like an expert by deriving practical recommendations from a knowledge base. An expert system includes a knowledge acquisition component, that is, the capability to create and improve the knowledge base, and a problem-solving component that is used for processing the information collected in the knowledge base.

In condition monitoring of vibrating machines, expert knowledge is required for signal interpretation. It is assumed that the vibrating machine behaves like a rigid body and has six degrees of freedom. Accordingly, the vibrating machine can perform different movement patterns of any complexity in the direction of the x-, y- and z-axis and about these axes.

With regard to the results of the analysis, in particular condition variables, spectra, orbits, etc., comprehensive knowledge of the condition monitoring system on the one hand and the cause-effect relationships of the monitored vibrating machine on the other hand are required. This knowledge is necessary to be able to produce a diagnosis and to be able to assign the obtained measurement results to a concrete cause of damage. Without this expert knowledge, it is not possible to conclude on the causes, for example, for the continuous increase in lateral acceleration, whereas the phase position of the longitudinal acceleration continuously decreases. Furthermore, the reasons as to how these condition variables/characteristic values likely continue to develop over time and when the machine is likely to actually fail (prognosis) also requires a comprehensive basis of experience based on similar, past damage patterns. In the case of vibrating machines, therefore, a multiplicity of influencing factors, for example loading, drive or wear processes, act on a multiplicity of condition variables. The challenge of correlating multiple condition variables while taking their temporal course into account in order to arrive at a sufficiently reliable diagnosis and prognosis poses a greater problem for a human being than for a processing unit. This relates to both the acquisition of knowledge as well as to the problem solving. Ultimately, the expert system/artificial intelligence acquired must be able to distinguish one case of damage from another based on the measurement data, such as an overload from a break. At the same time, the expert system/artificial intelligence must be able to differentiate natural and innocuous fluctuations, e.g., loading conditions, drive speeds, outside temperatures, etc., from actual damage conditions. If the diagnosis is made with sufficient certainty, the expert system/artificial intelligence must provide support regarding until when which maintenance measures, e.g., replacing a hollow traverse, optimization of material feed, are to be made to ensure an optimized predictive maintenance. This means that the expert system gained can be transferred back to the condition monitoring system of a vibrating machine, from which the data for the knowledge base of the expert system originates, in order to automatically interpret the real-time data sets there. In addition, the expert system can also be transferred to condition monitoring systems of other vibrating machines.

Advantageously, the characteristic values/condition variables which are processed by the processing unit relate to at least one parameter from the group: vibration amplitude, vibration frequency, angle of the main vibration direction, deviation from the nominal vibration direction, vibration harmonicity or phase position of the vibrations.

Accordingly, an evaluation or analysis of the characteristic values can take place as a trend analysis or limit value analysis. Here, for example, maximum values, RMS values or, for example, frequencies can be considered. According to the invention, the analysis takes place in such a way that on the basis of the characteristic values and/or stored data sets of a processing unit, a diagnostic of an anomaly in the condition of the vibrating machine, an error class, an indication of a failure time of the vibrating machine and/or a recommendation for a maintenance measure is created and/or displayed with the involvement of the expert system. While only process steps for measuring and analyzing are covered by existing condition monitoring systems, wherein the analysis is limited to the comparison of characteristic values with predetermined limit values, the method according to the invention automates the analysis and interpretation of characteristic values or measurement data. This significantly contributes to an increase in the efficiency and effectiveness in respect of maintenance. In this context, reference is often made to a condition monitoring expert system or CMES. To generate a condition monitoring expert system CMES, it is advantageous that the abovementioned steps a) to b) or a) to c) are repeated at will.

The advantage of the method according to the invention over methods in which the interpretation is carried out by a human expert is the speed provided due to the automation and the digital signal processing. Furthermore, the method can be continuously developed and/or improved by accumulating a large number of characteristic values and data sets.

Furthermore, the process steps and results are freely reproducible. The analyzed characteristic values and data set results are digital and can therefore be easily communicated and archived.

The method also provides that the metadata, which expands the metrologically acquired data sets, contains information regarding the class of the vibrating machine, the actual observed condition of the machine, additional information on the vibrating machine, operating information, ambient temperature, operating hours, operating cycles, load, speed, downtime and/or already performed maintenance measures.

The metadata can be assigned to the data sets either by means of manual input or by means of digital data acquisition.

Furthermore, the data sets expanded to include metadata can also be stored and thus made available to more users or operators.

The knowledge generation of the condition monitoring expert system can advantageously take place in that the generation of the characteristic values, the generation of the data sets, the analysis of the characteristic values, the stored data sets and/or the data sets expanded to include the metadata are based on an empirical model and/or theoretical model.

The invention also provides a condition monitoring system for a vibrating machine having at least one sensor designed for the acquisition of measurement values, and one processing unit designed for data acquisition and/or data archiving and/or data analysis. According to the invention, the condition monitoring system also comprises a display device which is provided to specify a diagnosis based on the data analysis or a prognosis of an anomaly of the latter machine or a further vibrating machine, a recommendation for a maintenance measure or an indication of a failure time of the latter machine or a further vibrating machine. A bidirectional connection is provided between the processing unit of the condition monitoring system and an external central data storage or an external central processing unit which serve to generate an expert system on the basis of the transferred data sets and/or theoretical models. Thus, the diagnosis, recommendation or specification of the condition monitoring system can be made based on the information/data from the expert system.

Alternative embodiments of the condition monitoring system for a vibrating machine provide that the sensor and/or the processing unit are arranged in a handheld device, a portable device or an online device.

While the handheld device is a very compact embodiment with a simple operation, a portable device is more comprehensive in respect of measuring techniques and requires a more complex installation on the vibrating machine.

By contrast, an online device is understood to be a permanently installed system which is installed indefinitely on the machine for purposes of monitoring.

In this case, it proves to be particularly advantageous if the condition monitoring system has a sufficient number of measuring channels or sensors so that any physical parameter, characteristic value, can be recorded that reflects the operating condition and/or degree of wear of the vibrating machine.

Advantageously, the condition monitoring system is designed modular with respect to the measuring channels and sensors so that the system can be adapted to a variety of vibrating machine types and systems.

The method according to the invention is further detailed below using a process diagram, wherein further features and advantages of the invention are further disclosed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 3 is a schematic representation of the processes of the method according to the invention for operating a condition monitoring system

DETAILED DESCRIPTION

Figure 1:
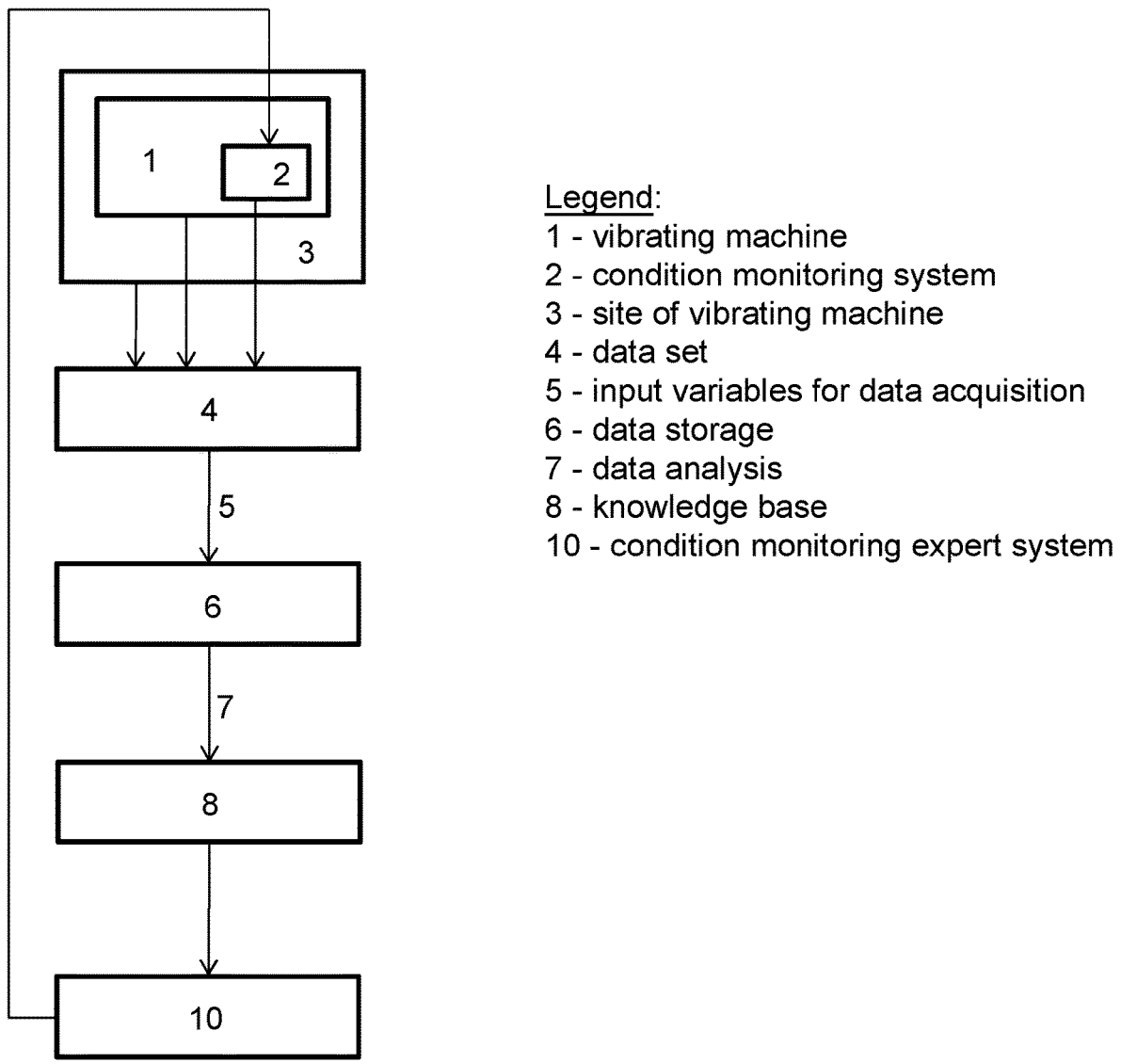
FIG. 1 is a process diagram of a sequence of method steps according to the invention.

The core process starts at the site 3 of a vibrating machine 1 for the systematic generation and processing of characteristic values, data, information or knowledge and for the integration of these characteristic values, data, information and knowledge into a condition monitoring system 2. The input variables for data acquisition 5 are supplied by the information at the site 3 of the vibrating machine, the information on the vibrating machine 1 or by the sensor or sensors included in the condition monitoring system 2. Whereas the information from the condition monitoring system 2 is referred to as characteristic values or data, the term metadata is used for the information derived from the site or the vibrating machine itself. From this information, characteristic values, data, metadata, a data set 4 or more data sets are formed, which are then stored in a data storage 6 and are therefore available for a data analysis 7. Data analysis 7 is understood to mean the conversion of data or information into knowledge through the use of data mining methods. To generate knowledge, empirical learning methods ("data mining", "machine learning") are usually complemented by theoretical methods. This means that knowledge generation can also be carried out by data experts or machine experts on the basis of experience, literature or on the basis of a simulation model.

Accordingly, the generation or expansion of a so-called knowledge base 8 can be done manually or automatically.

The knowledge collected in the knowledge base 8 in turn flows into a condition monitoring expert system 10, usually a software, so that based on that, a processing unit will display a condition diagnosis, a maintenance recommendation and a failure prognosis with regards to the monitored vibrating machine.

These recommendations or particulars can on the one hand be displayed by a processing unit or control center remotely located from the site 3 of the vibrating machine 1, or be made available and implemented directly on the vibrating machine 1.

Figure 2:
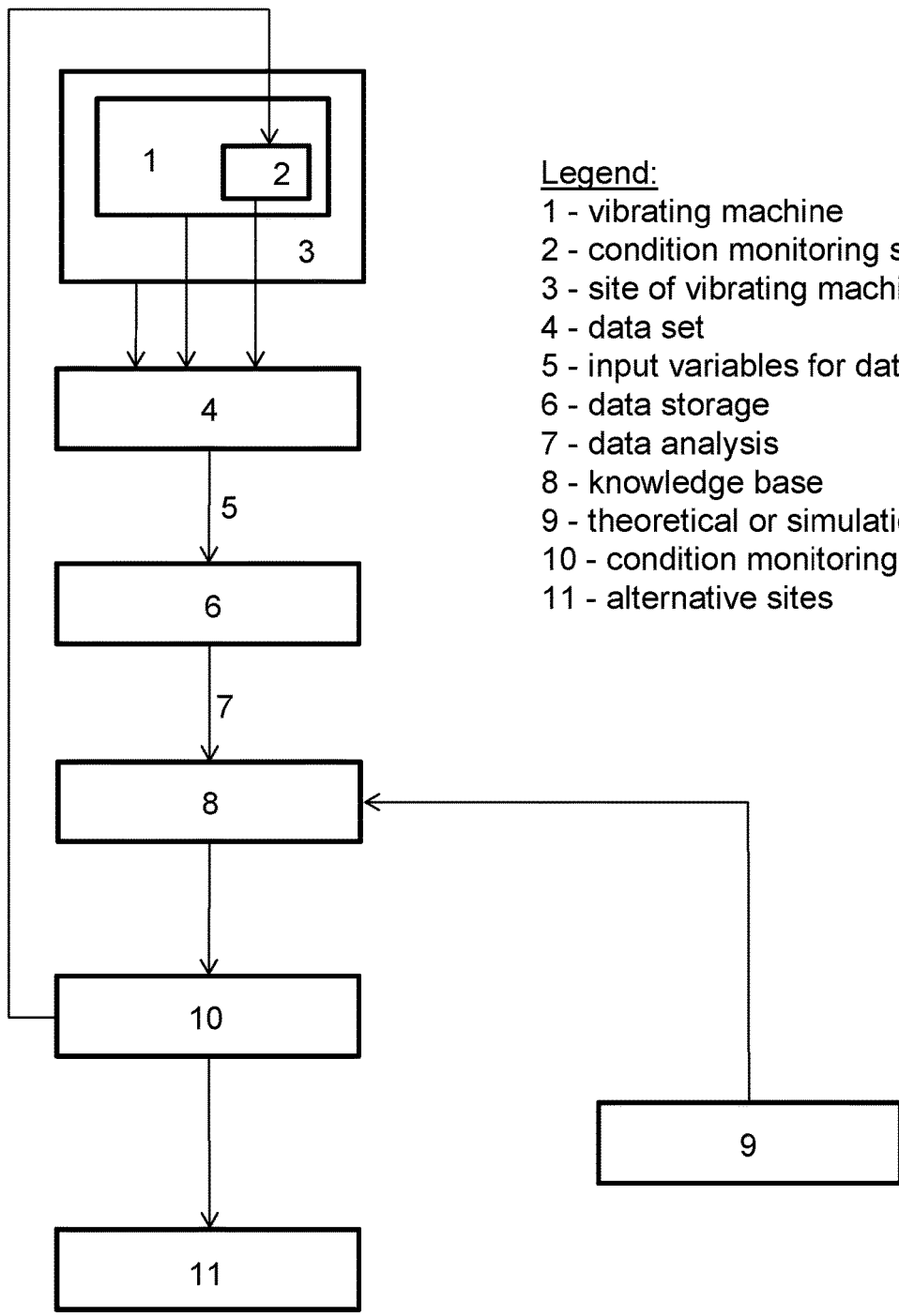
FIG. 2 illustrates an embodiment of the method according to the invention.

In addition, these characteristic values, data, information and recommendations, or the content of the knowledge base 8, can also be used and implemented as shown in FIG. 2 for other or for alternative sites 11, vibrating machines.

FIG. 2 illustrates an expansion of the empirical approach of the invention. Here the knowledge base 8 is expanded to include information that is developed via a mathematical or simulation model 9. The input for the simulation model is usually provided by external machine experts who draw their knowledge from specialist literature, machine-specific documentation or practical experience in handling vibrating machines. The content of the knowledge base 8, which forms the basis for a condition-based diagnosis, includes, for example, mathematical and logical rules, business processes, conditional probabilities, neural networks, and Bayesian networks.

FIG. 3 schematically shows the method according to the invention for operating a condition monitoring system with one or more vibrating machines 1a, 1b, 1c, in the manner of a vibrating screen. On side walls of the vibrating machine 1, at least two sensors 12 are mounted, which are in data connection with a processing unit 13 of a condition monitoring system 2a, 2b, 2c. The data connection, which is shown in dashed lines in the figure, can be made via a radio connection, wired connection, or via a permanent or temporary connection. The measurement data supplied by the sensors 12 are processed into characteristic values in the processing unit 13 and stored as data sets. The processing unit 13 of the condition monitoring system 2b, 2c in turn is in connection with a data storage 6 in which the data sets of one or more condition monitoring systems 2b, 2c can be stored. In addition, the data sets containing the metrologically recorded characteristic values can be expanded to include metadata which contains the actual conditions of the vibrating machine 1 or other operating information. Information is obtained from the stored data sets or the data sets expanded to include metadata and information is linked so that a knowledge base 8 can be generated. This knowledge base 8 is fed from two sources, firstly, from data mining of the metrologically acquired data sets and the data sets expanded to include the metadata, and secondly, from theoretical models or simulation models 9.

The knowledge stored in the knowledge base 8 is transferred to a software, which can be referred to as an expert system 10. The expert system 10 can ultimately be transferred to the condition monitoring systems 2a, 2b, 2c in order to locally interpret the measurement data or the characteristic values obtained from the measurement data. The practical recommendations that are derived from the expert system 10 can in turn be "displayed on the condition monitoring system 2a, 2b, 2c."

This results in the advantage that a condition monitoring system 2a, 2b, 2c according to the invention no longer requires a human expert when interpreting the metrologically recorded data, and nevertheless ensures condition-based and/or predictive maintenance.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating condition monitoring systems of vibrating machines in the form of a vibrating conveyor or a vibrating screen, whereby the vibrating machines perform different movement patterns of any complexity in the direction of the x-axis, the y-axis and the z-axis and about the x-axis, the y-axis and the z-axis, wherein each respective one of the vibrating machines has a respective one of the condition monitoring systems, wherein each of the condition monitoring systems comprise at least one sensor designed for motion detection and/or acceleration detection, which is mounted on each respective one of the vibrating machines, the method comprising:
  providing, via the at least one sensor, measurement data which is further processed into characteristic values/condition variables in a processing unit connected with the at least one sensor;
  storing, in the processing unit connected with the at least one sensor, the characteristic values/condition variables as at least one data set;
  transmitting the at least one data set from the processing unit connected with the at least one sensor to a central data storage that communicates with the condition monitoring system of each of the vibrating machines;
  generating, via an external central processing unit, a knowledge base for an expert system taking into account information provided by the at least one data set in the central data storage for each of the condition monitoring systems and based on theoretical models;
  in order to assign the measurement data provided by the at least one sensor to a cause of damage, analyzing the at least one data set in the processing unit connected to the at least one sensor of each of the vibrating machines with the involvement of the knowledge base generated for the expert system, while correlating multiple ones of the characteristic values/condition variables and taking a temporal course of the multiple ones of the characteristic values/condition variables into account; and
  producing and/or displaying, via the processing unit connected to the at least one sensor, a diagnosis and/or a prognosis of an anomaly in the condition of the respective one of the vibrating machines, a recommendation for a maintenance measure or an indication of a failure time of the respective one of the vibrating machines.

2. The method according to claim 1, wherein the characteristic values/condition variables comprise at least one parameter from the group consisting of: vibrating amplitude, vibrating frequency, angle of the main vibrating direction, deviation from the nominal vibrating direction, vibrating harmonicity or phase position of the vibrations.

3. The method according to claim 1, wherein, for generating the knowledge base for the expert system, the steps of providing and storing the characteristic values/condition variables are repeated.

4. The method according to claim 1, wherein the at least one data set containing the characteristic values/condition variables is expanded to include metadata which contains information relating to a class of the vibrating machines, additional information on the vibrating machines, measurement parameters of the condition monitoring systems, operating information, ambient temperature, operating times, operating cycles, load, speed, downtime and/or previous maintenance measures.

5. The method according to claim 4, wherein the metadata is assigned to the at least one data set via manual input or digital data acquisition.

6. The method according to claim 4, wherein generation of the characteristic values/condition variables, generation of the at least one data set, analysis of the characteristic values/condition variables, the at least one data set and/or the at least one data set expanded to include the metadata are built on an empirical model and/or a theoretical model.

7. A condition monitoring system for a vibrating machine that performs different movement patterns of any complexity in the direction of the x-axis, the y-axis and the z-axis and about the x-axis, the y-axis and the z-axis, the condition monitoring system comprising:
  at least one sensor designed for measuring values;
  a processing unit for data acquisition, data archiving and data analysis, wherein the processing unit is configured to process the measuring values into characteristic values/condition variables and store the characteristic values/condition variables as at least one data set; and
  a display device, which is provided to display a diagnosis of an anomaly of the vibrating machine and which is based on the data analysis, a recommendation for a maintenance measure or an indication of a failure time of the vibrating machine,
  wherein an external central data storage is provided to store the at least one data set, wherein an expert system is generated by an external central processing unit based on the at least one data set stored in the external central data storage and theoretical models, and wherein the diagnosis, the recommendation or the indication provided by the processing unit of the condition monitoring system takes place on the basis of information/data from the expert system, generated by the external central processing unit, while correlating multiple ones of the characteristic values/condition variables and taking a temporal course of the multiple ones of the characteristic values/condition variables into account.

8. The condition monitoring system for a vibrating machine according to claim 7, wherein the sensor and/or the processing unit are arranged in a handheld device, a portable device or an online device.

* * * * *